(12) United States Patent
Li et al.

(10) Patent No.: US 7,111,361 B2
(45) Date of Patent: Sep. 26, 2006

(54) HINGE ASSEMBLY

(75) Inventors: Chang Zhi Li, Shenzhen (CN); Chia-Hua Chen, Tu-chen (TW)

(73) Assignees: Shenzhen Futaihong Precision Industrial Co., Ltd., Shenzhen (CN); Fih Co., Ltd., Shindian (TW)

( * ) Notice: Subject to any disclaimer, the term of this patent is extended or adjusted under 35 U.S.C. 154(b) by 0 days.

(21) Appl. No.: 10/852,903

(22) Filed: May 24, 2004

(65) Prior Publication Data

US 2004/0261224 A1 Dec. 30, 2004

(30) Foreign Application Priority Data

May 23, 2003 (TW) .............................. 92209565 U

(51) Int. Cl.
E05F 1/24 (2006.01)
(52) U.S. Cl. ............................. 16/284; 16/303; 16/330; 16/313
(58) Field of Classification Search ............... 16/284, 16/285, 303, 330, 312, 313; 379/433.13
See application file for complete search history.

(56) References Cited

U.S. PATENT DOCUMENTS

| | | | | |
|---|---|---|---|---|
| 5,628,089 A | * | 5/1997 | Wilcox et al. ................ | 16/303 |
| 5,697,124 A | * | 12/1997 | Jung ............................ | 16/341 |
| 6,085,387 A | * | 7/2000 | Han ............................. | 16/330 |
| 6,678,539 B1 | * | 1/2004 | Lu ........................... | 455/575.1 |
| 2001/0036265 A1 | * | 11/2001 | Oh ........................ | 379/433.01 |
| 2004/0177477 A1 | * | 9/2004 | Hsieh ......................... | 16/303 |
| 2004/0237259 A1 | * | 12/2004 | Huang et al. ................ | 16/330 |
| 2004/0244147 A1 | * | 12/2004 | Qin et al. .................... | 16/330 |
| 2005/0138774 A1 | * | 6/2005 | Gan ............................ | 16/367 |

FOREIGN PATENT DOCUMENTS

| | | | |
|---|---|---|---|
| EP | 1329981 A2 | * | 7/2003 |
| JP | 09284165 A | * | 10/1997 |

* cited by examiner

Primary Examiner—Chuck Y. Mah
Assistant Examiner—Mark T. Vogelbacker
(74) Attorney, Agent, or Firm—Wei Te Chung

(57) ABSTRACT

A hinge assembly for joining a cover to a main body of a folding phone, includes a housing (1), a cam (2), a cam follower (3), a spring (4), and an end cover (5). The cam and the cam follower are received in the housing with a connector (21) of the cam extending through a rear end (11) of the housing. The cam follower has a cylindrical main body (30) with a protrusion (31) extending from each opposite end thereof. The cylindrical main body can move along a cam surface (20) of the cam for being received in valleys (22) of the cam surface while the protrusions sliding in the housing. The end cover is inserted into the housing for locking the hinge components in the housing. The spring is compressively coupled between the cam follower and the end cover.

9 Claims, 5 Drawing Sheets

HINGE ASSEMBLY

BACKGROUND OF THE INVENTION

1. Field of the Invention

The present invention relates to an apparatus for hinging together the housings of foldable devices, and particularly to an apparatus for hinging together the housings of a foldable mobile phone.

2. Description of Related Art

Portable radiotelephones having two housings joined by a type of hinge that allows the housings to fold upon one another are known in the art. Some such folding radiotelephones have most of the electronics in one housing, called the main housing, and fewer electronics in the other housing, called the cover. Other such folding radiotelephones have all the electronics in the body with the cover serving only to cover the keypad or keypad and display of the phone. Manufacturers have tried to reduce the volume, size and weight of the portable radiotelephone. Thus, it is desirable that the hinge coupling the main housing with the cover is modulated and miniaturized. The modulated hinge device is required to have the structure for holding moving parts of the hinge, such as a cam member, a cam follower and a spring. For miniaturization, the size and the number of parts of the hinge should be reduced.

Such a hinge assembly is disclosed in U.S. Pat. No. 5,628,089, as shown in FIG. 5, which includes a can 303 for encasing a spring 405, a cam 404, and a cam follower 403 therein. A cap 305 covers the can 303 at an opened end thereof. The cam follower 403 is engaged with the cam 404 with a tab 415 of the cam follower 403 moving along a cam surface 419 for being received in valleys of the cam 404. The cam 404 can slide in the can 303 by way of rails 417 on an exterior surface 467 of the cam 404 sliding in guides 437 in an interior surface 465 of the can 303. The cap 305 covers over the can 303 with two arms 409 being inserted into slots 423 defined in an exterior surface of the can 303 and two barbs 411 being latched into holes 435, while a head 413 of the cam follower 403 extends through a hole of the cap 305 and a step 445 is fitted in the hole of the cap 305, thus the cam components are assembled and fixed into the can 303. However, the cam follower 403 has a very complicated configuration for manufacturing. Furthermore, the locking means by way of two barbs 411 being latched into holes 435 is not reliable, and it can be easily dismissed during cover rotation of the folding phone.

Therefore, an improved hinge assembly is desired which overcomes the disadvantages of the prior art.

SUMMARY OF THE INVENTION

A main object of the present invention is to provide a reliable hinge assembly having a reduced size.

To achieve the above object, a hinge assembly for joining a cover to a main body of a folding phone, comprises a housing, a cam, a cam follower, a spring, and an end cover. The cam and the cam follower are received in the housing with a connector of the cam extending through a rear end of the housing. The cam follower has a cylindrical main body with a protrusion extending from each opposite end thereof. The cylindrical main body can move along a cam surface of the cam for being received in valleys of the cam surface while the protrusions sliding in the housing. The end cover is inserted into the housing for locking the hinge components in the housing. The spring is compressively coupled between the cam follower and the end cover.

Other objects, advantages and novel features of the invention will become more apparent from the following detailed description of a preferred embodiment thereof when taken in conjunction with the accompanying drawings, wherein:

DETAILED DESCRIPTION OF THE INVENTION

Figure 1:
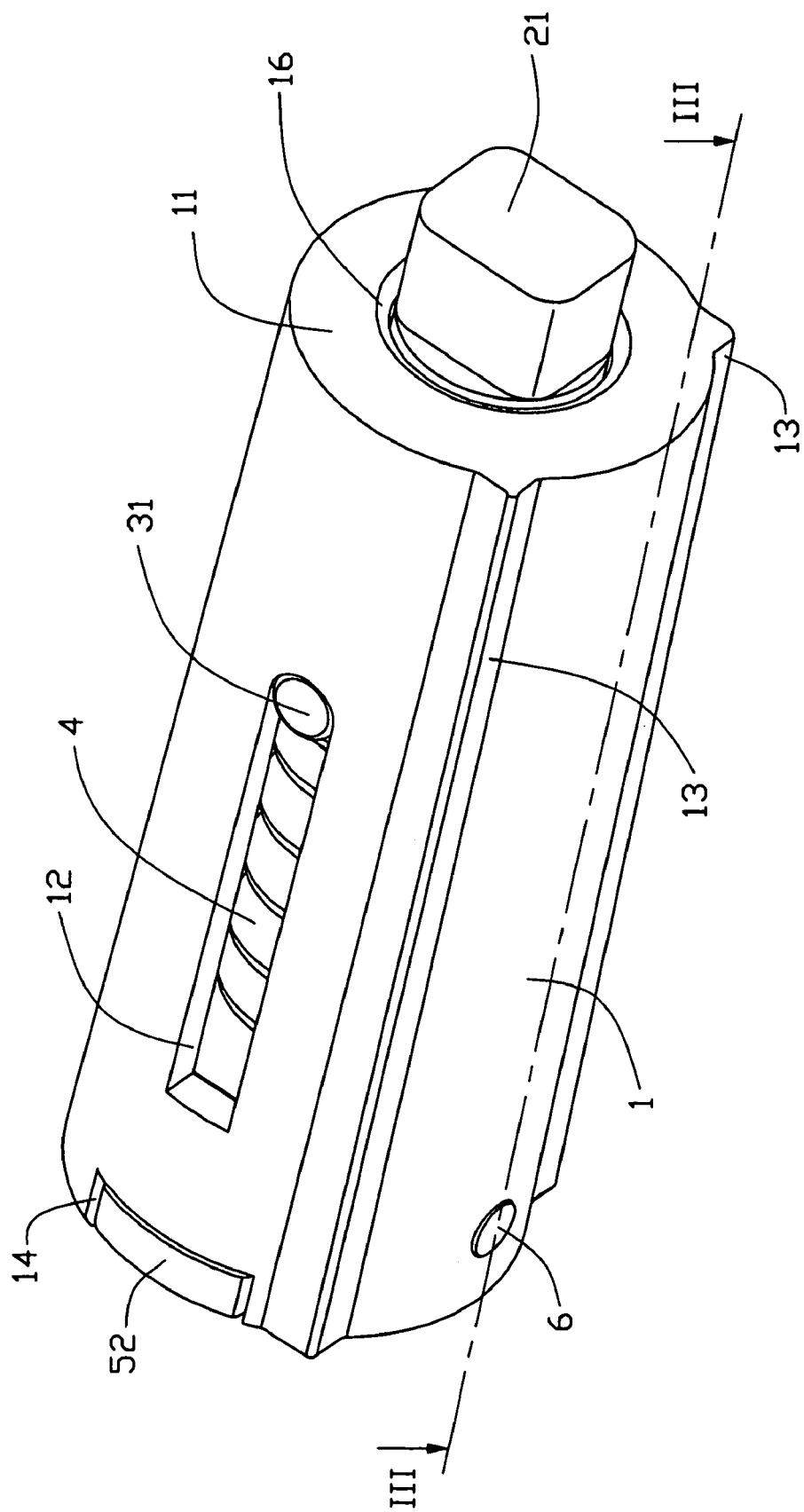
FIG. 1 is an assembled, perspective view of a hinge assembly in accordance with a preferred embodiment of the present invention.
Figure 2:
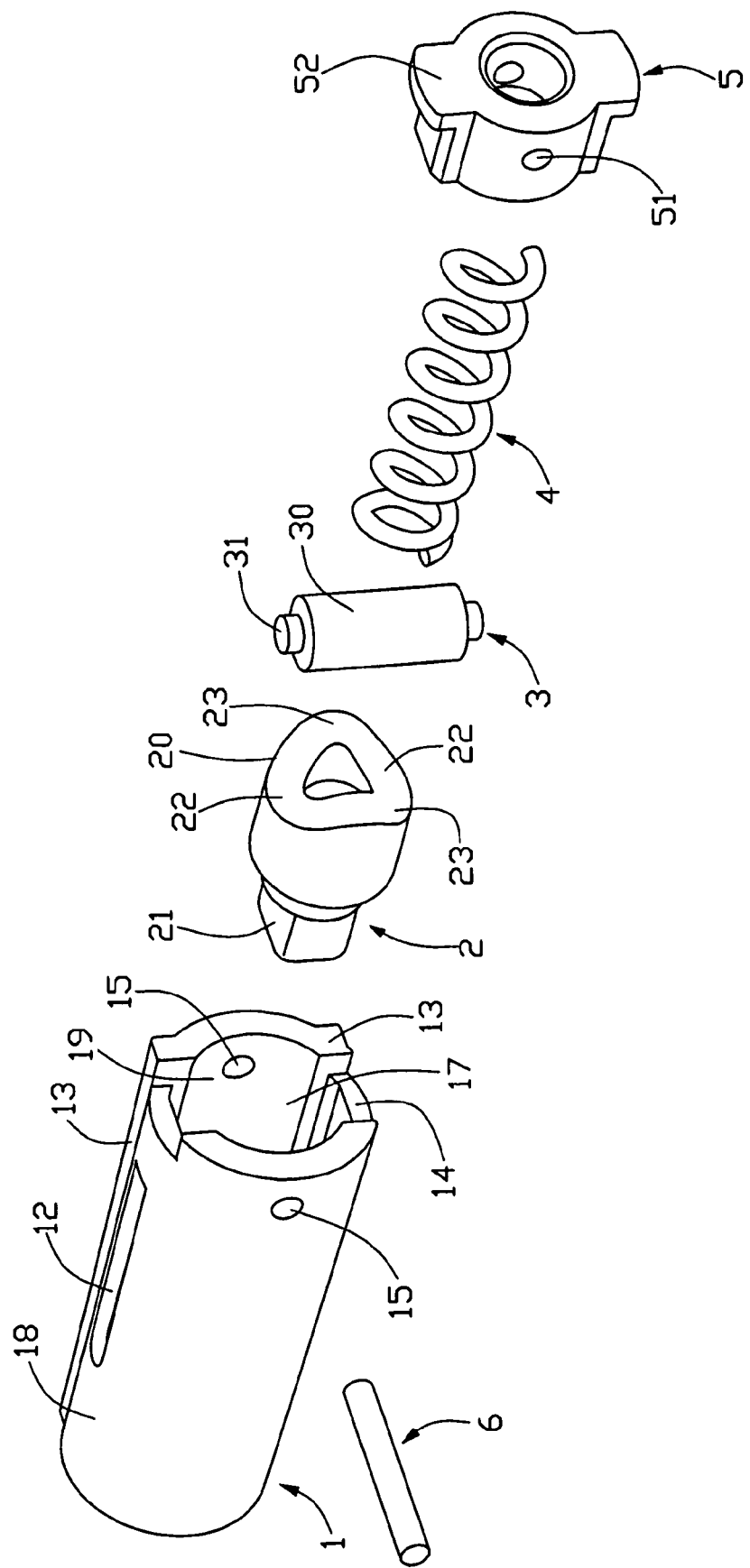
FIG. 2 is an exploded, perspective view of the hinge assembly of FIG. 1.
Figure 3:
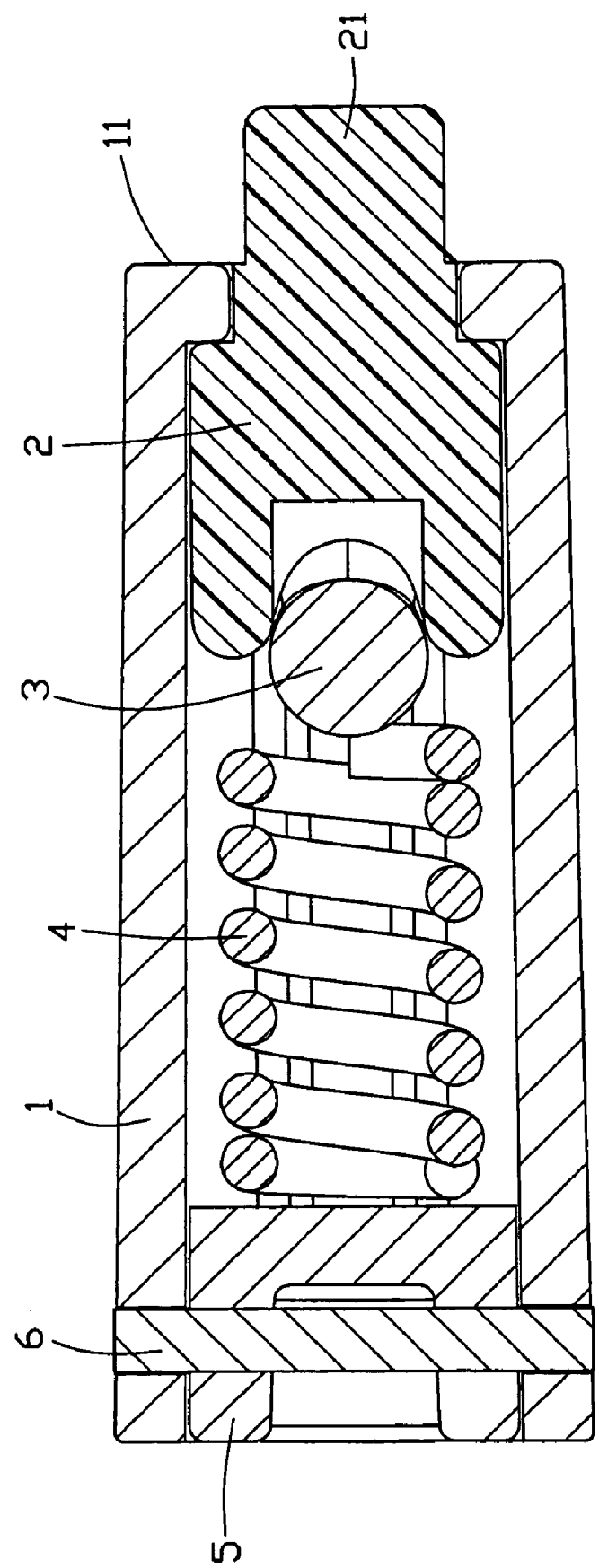
FIG. 3 is a cross-sectional view taken along a line III—III of FIG. 1.
Figure 4:
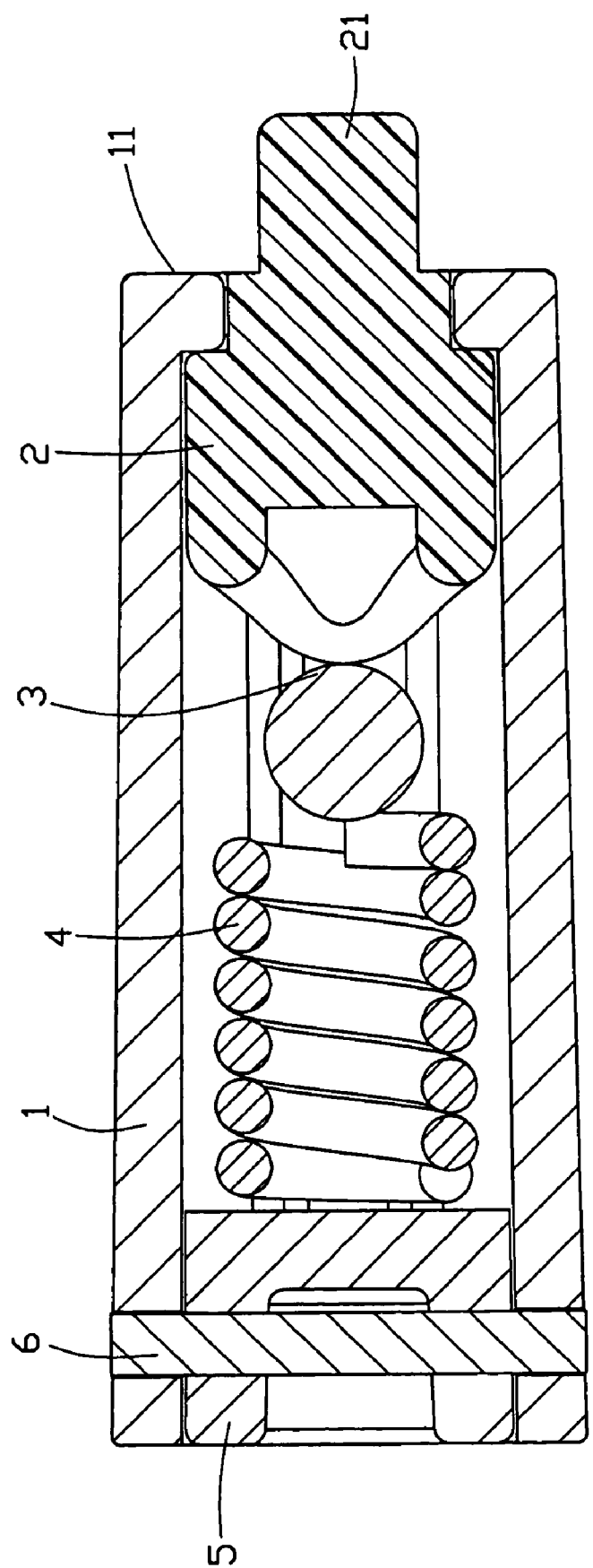
FIG. 4 is a cross-sectional view of the hinge assembly of FIG. 1 when the hinge assembly is in a position different from FIG. 3.
Figure 5:
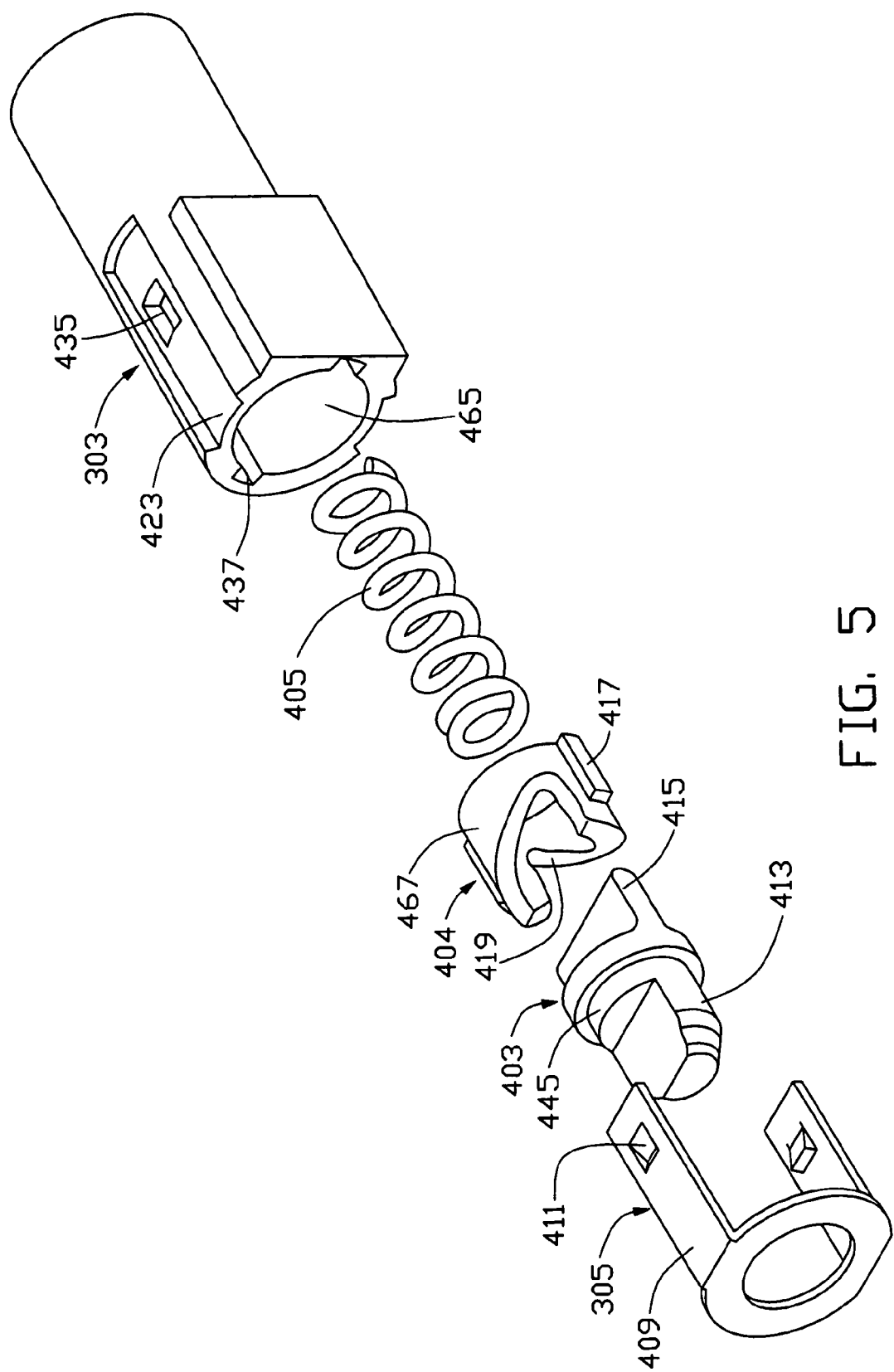
FIG. 5 is an exploded, perspective view of a hinge assembly of the prior art.

Referring now to the drawings in detail, FIGS. 1 and 2 show a hinge assembly for joining a cover to a main body of a folding phone (not shown). The hinge assembly comprises a housing 1, a cam 2, a cam follower 3, a spring 4, and an end cover 5. Wherein the cam 2, the cam follower 3, and the spring 4 are received in the housing 1, and the end cover 5 covers the housing 1 at one end thereof. An elongated pin 6 is inserted into the housing for fixing the hinge assembly.

The housing 1 is generally cylindrically shaped, hollow, partly closed at a rear end and opened at a front end, thus forming a rear wall 11 at the rear end and an opened end 17 at the front end. The rear wall 11 defines a concentric hole 16 at its center. A pair of keys 13 formed on an exterior surface 18 of the housing 1 is rectilinear and extends approximately full of the length of the housing 1. Each of the keys 13 is encircled by a plurality of flat surfaces (not labeled). The keys 13 are used to align the hinge assembly relative to the cover of the folding phone when the housing 1 is inserted into a cavity of the cover. Two elongated guiding grooves 12 are formed along a rotating axis, and extend from the exterior surface 18 to an interior surface 19 of the housing 1, being opposite to each other and located 180 degrees from one another. The housing 1 defines a pair of opposite cutouts 14 at the opened end 17. A pair of opposite pinholes 15 is defined through a wall of the housing 1 adjacent to the opened end 17.

The cam 2 includes a cylindrical, hollow cam body (not labeled) with a diameter smaller than an inner diameter of the housing 1. The cam body has a cam surface 20 with valleys 22 and peaks 23 formed thereon, preferably two valleys located 180 degrees from one another and two peaks located 180 degrees from each other. A connector 21 extends from the cam body opposite to the cam surface 20, and has a rectangular shape in a size corresponding to the hole 16 of the housing 1.

The cam follower 3 has a cylindrical main body 30 with two concentric protrusions 31 extending from opposite ends thereof. Each of the protrusions 31 is generally in a cylindrical shape having a diameter smaller than that of the main body 30 and slightly smaller than the width of the guiding groove 12 of the housing 1, while the diameter of the main body 30 of the cam follower 3 is greater than the width of the guiding groove 12 of the housing 1. The full height of the cam follower 3 is approximately equal to an outer diameter of the housing 1. When the cam follower 3 engages with the cam 2, an axis of the cam follower 3 is perpendicular to an axis of the cam 2.

The spring 4 is composed of metal and is spiral-shaped, with an outer diameter smaller than the inner diameter of the housing 1.

The end cover 5 is generally hollow, is sealed at a rear end thereof for being coupled to the spring 4, and forms a hole at a front end for engaging with the cover of the folding phone. A pair of L-shaped block 52 is formed on an exterior surface of the end cover 5, extends longitudinally and is located 180 degrees from one another, with two upstanding tabs (not labeled) aligned with the front end of the end cover 5. A pair of pinholes 51 corresponding to the pinholes 15 is formed through a wall of the end cover 5.

The elongated pin 6 has a diameter corresponding to those of the pinholes 15 and 51.

Referring to FIGS. 1–4, in assembly, the cam 2 is inserted into the housing 1 from the opened end 17 thereof with the connector 21 thereof extending through the hole 16 of the rear wall 11 of the housing 1. The cam 2 is rotatably engaged with the housing 1. The cam follower 3 is inserted into the housing 1 with the two protrusions 31 thereof being slidably received in the corresponding guiding grooves 12 of the housing 1, and the main body 30 being received in the valleys 22 of the cam 2 (see FIG. 3). Then, the spring 4 and the end cover 5 are inserted into the housing 1, so that the spring 4 is compressively coupled between the main body 30 of the cam follower 3 and the rear end of the end cover 5, the L-shaped blocks 52 are perfectly received in the cutouts 14 of the housing 1 (see FIG. 1), and the pinholes 51 are aligned with the pinholes 15. After that, the pin 6 is inserted respectively through the pinholes 15 and 51 for further locking the hinge components in the housing 1. Finally, The housing 1 is inserted into the cavity (not shown) of the cover of the folding phone, and the connector 21 of the cam 2 is engaged in the main body of the folding phone.

In use, when the cover of the folding phone rotates between an open position and a closed position, the housing 1 rotates along with the cover, while the cam 2 keeps relatively stationary with the main body of the folding phone. The cam follower 3 and the end cover 5 rotate along with the housing 1. As a result, the cylindrical main body 30 of the cam follower 3 moves along the cam surface 20 from the valleys 22 to the peaks 23 (see FIG. 4) while the protrusions 31 slides along the corresponding guiding grooves 12, and the spring 4 is compressed. The main body 30 of cam follower 3 continues to move under the spring force until it passes the peaks 23 and is received the valleys 22 again. Therefore, the cover is open with the main body 30 of cam follower 3 mating with the valleys 22, or closed, with the main body 30 of cam follower 3 mating with the valleys 22 again.

In other embodiments, the end cover 5 can be designed as a cylinder having a diameter slightly greater than the inner diameter of the housing 1, so that the end cover 5 is inserted into the housing 1 and is locked at the opened end 17. The end cover 5 can also be designed as a screw top, and the housing 1 is threaded on the interior surface 19 or on the exterior surface 18 at the opened end 17, so that the end cover 5 can be threadedly engaged with the housing 1. Thus the pin 6 is not necessary for locking the hinge components.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A hinge assembly for joining a cover to a main body of a folding device, comprising:
   a housing;
   a cam having a cam surface forming a pair of valleys opposite to each other and a pair of peaks opposite to each other;
   a generally cylindrical cam follower including cylindrical main body with two concentric protrusions, an axis of the cam follower being perpendicular to an axis of the cam; and
   an urging mechanism to urge the folding device into or out of an open or a closed position during rotation of the cover;
   wherein the cam and the cam follower are received in the housing, the cam is rotatably engaged with the housing, the cam follower is movably engaged with the cam surface for being received in the pair of valleys of the cam while slidably engaging with the housing, and the urging mechanism is coupled to the cam follower and a front end of the housing.

2. The hinge assembly as claimed in claim 1 wherein the urging mechanism comprises an elastic element for compressively engaging with the cam follower.

3. The hinge assembly as claimed in claim 2, wherein the urging mechanism further comprises an end cover, and the elastic element is coupled between the cam follower and the end cover.

4. The hinge assembly as claimed in claim 3, wherein the end cover is engaged with the housing at an open end of the housing, for locking the cam, the cam follower and the elastic element in the housing.

5. The hinge assembly as claimed in claim 4, wherein pinholes are defined in the housing and in the end cover, and a cylindrical pin is inserted through the pinholes for locking the end cover with the housing.

6. The hinge assembly as claimed in claim 1, wherein the housing defines at least one guiding groove, the cam follower has at least one protrusion at one end thereof and the at least one protrusion slides in the at least one guiding groove.

7. The hinge assembly as claimed in claim 1, wherein the housing forms at least one key on an exterior surface thereof for engaging with the cover of the folding device.

8. The hinge assembly as claimed in claim 7, wherein the at least one key is rectilinear and encircled by a plurality of flat surfaces.

9. The hinge assembly as claimed in claim 1, wherein the cam has a connector extending through a rear end of the housing for engaging with the main body of the folding device.

* * * * *